United States Patent [19]

Yagasaki

[11] Patent Number: 4,603,245

[45] Date of Patent: Jul. 29, 1986

[54] TEMPERATURE CONTROL APPARATUS

[75] Inventor: Toshiaki Yagasaki, Hino, Japan

[73] Assignee: Canon Kabushiki Kaisha, Tokyo, Japan

[21] Appl. No.: 524,228

[22] Filed: Aug. 18, 1983

[30] Foreign Application Priority Data

| Aug. 23, 1982 | [JP] | Japan | 57-145827 |
| Jan. 31, 1983 | [JP] | Japan | 58-15344 |
| Jan. 31, 1983 | [JP] | Japan | 58-15345 |
| Jan. 31, 1983 | [JP] | Japan | 58-15346 |

[51] Int. Cl.$^4$ ............................................. G03G 15/20
[52] U.S. Cl. .............................. 219/216; 355/14 FU; 219/494; 219/492
[58] Field of Search ..................... 355/14 FU, 3 FU; 219/216, 492, 482, 490, 494, 497, 504, 505

[56] References Cited

U.S. PATENT DOCUMENTS

| 3,851,144 | 11/1974 | Hutner | 219/216 |
| 3,878,358 | 4/1975 | Barton | 219/216 |
| 3,916,146 | 10/1975 | Hutner | 219/216 |
| 4,006,985 | 2/1977 | Hutner | 219/216 |
| 4,180,721 | 12/1979 | Watanabe | 219/216 |
| 4,256,951 | 3/1981 | Payne | 219/492 |
| 4,277,670 | 7/1981 | Mori | 219/494 |
| 4,318,612 | 3/1982 | Brannan | 219/216 |
| 4,340,807 | 7/1982 | Raskin | 219/497 |
| 4,374,321 | 2/1983 | Cunningham | 219/216 |
| 4,400,613 | 8/1983 | Popelish | 219/492 |
| 4,415,800 | 11/1983 | Dodge | 219/216 |

*Primary Examiner*—Clarence L. Albritton
*Assistant Examiner*—Teresa J. Walberg
*Attorney, Agent, or Firm*—Fitzpatrick, Cella, Harper & Scinto

[57] ABSTRACT

A temperature control apparatus for a copying machine has a halogen heater for heating a fixing roller, a thermistor for detecting the surface temperature of the fixing roller, and a microcomputer for performing ON/OFF control of the halogen heater in accordance with an output from the thermistor. After the heater is turned on or off, the heater is kept in the ON or OFF state for a predetermined period time irrespective of the output from the thermistor. A waiting time before using the copying machine after the power is turned on is shortened without requiring a heater having a high output power. Erratic operation due to noise generated upon turning on or off of the heater is prevented.

15 Claims, 21 Drawing Figures

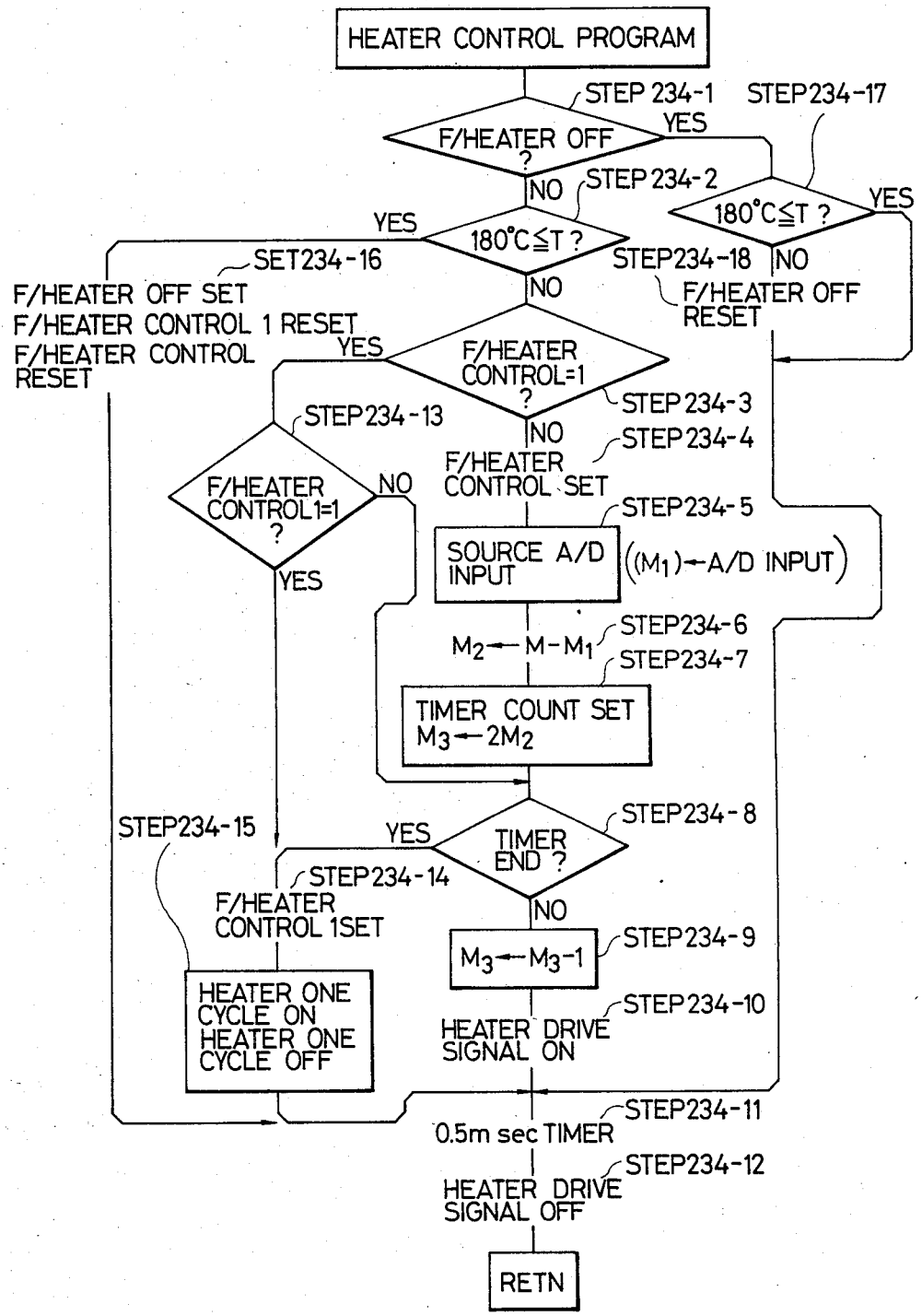

TEMPERATURE CONTROL APPARATUS

BACKGROUND OF THE INVENTION (a) Field of the Invention

The present invention relates to a temperature control apparatus of a fixer in a recording apparatus such as a copying machine or a laser beam printer.

(b) Description of the Prior Art

In a conventional fixer of a recording apparatus of this type, the temperature of the fixer is detected by a heat-sensitive element such as a thermistor, and ON/OFF control of a heating source such as a heater is performed in accordance with a predetermined reference temperature. More specifically, assume that the predetermined reference temperature is set at 180° C. Then, if the detected temperature is lower than the reference temperature, the heater is turned on. On the other hand, if the detected temperature is higher than the reference temperature, the heater is turned off.

In a fixer of this configuration, there is some waiting time after power is turned on before the fixer reaches a predetermined temperature and a recording operation can be performed. In order to shorten this waiting time, it has been proposed to use a heater of higher output power. However, if the output power of the heater is too high, the fixer may be damaged by overshoot or the like after being kept ON until the reference temperature is reached.

Moreover, when such a high output heater is used, a rush current flows to the heater when the heater is turned on. This results in an input power down; a steady state can only be attained after a considerable length of time. This may also adversely affect AC loads.

SUMMARY OF THE INVENTION

The present invention has been made in consideration of this and has for its object to provide a temperature control apparatus which eliminates the problems encountered in ON/OFF control of a heating source.

It is another object of the present invention to provide a temperature control apparatus which reduces temperature changes and rush current during ON/OFF control of a heating source.

It is still another object of the present invention to provide a temperature control apparatus which is capable of performing control of a heating source independently of a detected temperature within a predetermined time period from an ON/OFF operation of the heating source.

It is still another object of the present invention to provide a temperature control apparatus which is capable of maintaining a short power fluctuation time upon energization of a heating source.

It is still another object of the present invention to provide a temperature control apparatus which is capable of minimizing power consumption.

The above and other objects and advantages of the present invention will become apparent from the following description taken in conjunction with the accompanying drawings.

BRIEF DESCRIPTION OF THE DRAWINGS:

FIG. 2-1 is a block diagram of a control section of the present invention;

FIG. 2-2 is a circuit diagram of a drive circuit of a halogen heater;

FIGS. 3B and 3C show signal waveforms at points B and C of the circuit shown in FIG. 2-1;

FIGS. 4-1 to 4-4 are flowcharts according to an embodiment of the present invention;

FIGS. 12-1 to 12-3 are flowcharts according to still another embodiment of the present invention;

FIG. 12-4 is a flowchart according to still another embodiment of the present invention;

DETAILED DESCRIPTION OF THE PREFERRED EMBODIMENTS

The preferred embodiments of the present invention will now be described in more detail with reference to the accompanying drawings.

Figure 1:
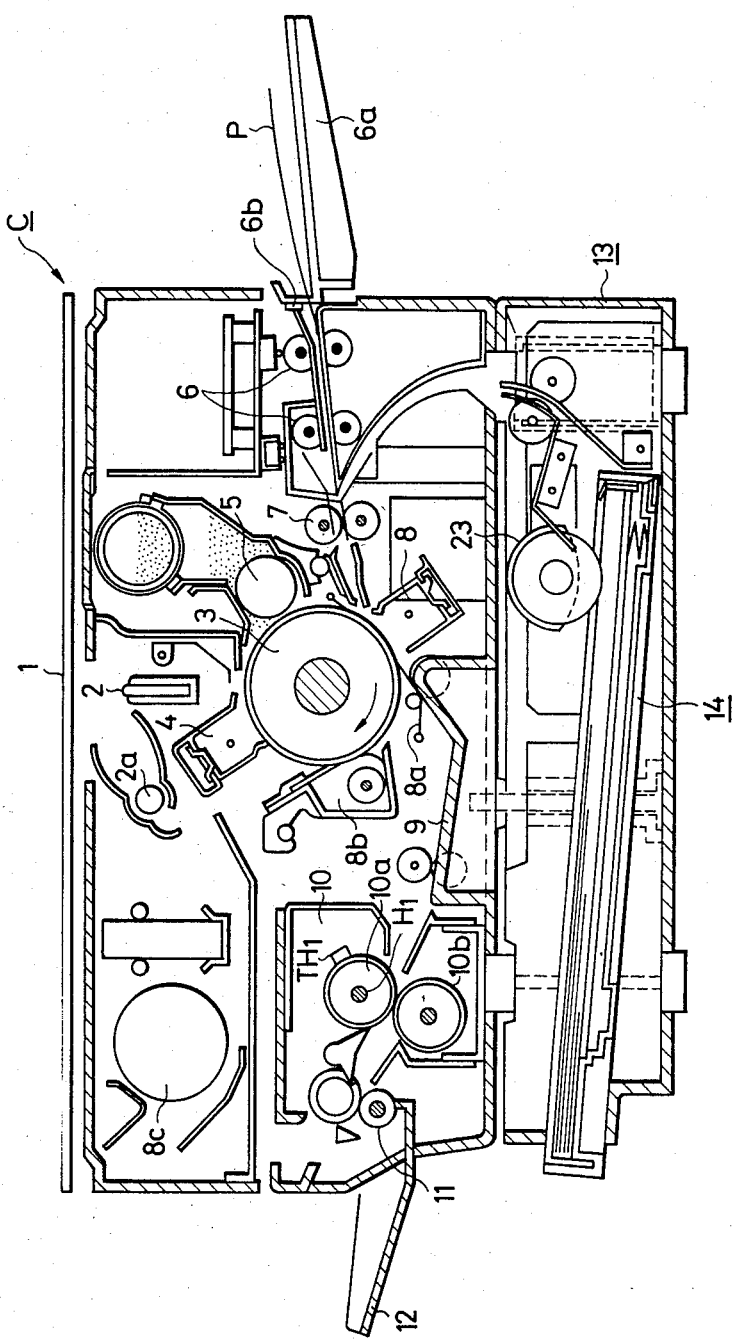
FIG. 1 is a sectional view of a copying machine to which the present invention can be applied.

FIG. 1 is a sectional view of a copying machine to which the present invention can be applied. Referring to FIG. 1, an original table 1 comprises a transparent member and is reciprocated past an imaging element array 2 shown in an end view. The elements have a short focal length and a small diameter and they are placed below the original table 1. Light from a light source 2a is radiated onto an original placed on the original table 1. A reflected original image is slit-exposed onto a photosensitive drum 3 by the array 2. A charger 4 uniformly charges the photosensitive drum 3 prior to slit-exposure. The charged drum 3 is slit-exposed by the array 2 and an electrostatic latent image of the original image is formed thereon. The latent image is then visualized by a developing unit 5. A transfer paper sheet P fed from a manual feed port 6a is fed onto the drum 3 by feed rollers 6 and register rollers 7. The feed rollers 6 rotate in response to a detection signal from a sensor means 6b which detects that a transfer paper sheet P is fed. The register rollers 7 rotate at a proper timing so that the image on the drum 3 opposes a proper position on the transfer paper sheet P. A toner image or a visualized image on the drum 3 is transferred onto the transfer paper sheet P by a transfer charger 8. Thereafter, the transfer paper sheet is separated from the drum 3 by a separating means 8a, and is guided to a fixer 10 by a guide 9. The image transferred onto the transfer paper sheet P is fixed by a fixing roller 10a having a halogen heater H₁ therein. The transfer paper sheet P having the fixed image thereon is discharged into a tray 12 by an exhaust roller 11. A thermistor TH₁ detects a surface temperature of the fixing roller 10a. The copying machine further has a cleaning means 8b and a cooling fan 8c.

The copying machine as described above has a manual feed unit which allows manual feed of a single transfer paper sheet. However, when a large number of transfer paper sheets must be continuously copied, an attachment 13 can be connected to the lower portion of a copying machine main body C so as to allow continuous paper feed from a cassette 14.

The fixer 10 has the fixing roller 10a having therein the halogen heater H₁, and a pressure roller 10b which urges against the roller 10a. The fixing roller 10a consists of a metal roller and a coating layer of tetraethylene fluoride resin. The pressure roller 10b consists of a metal core as a central shaft, a sponge layer formed thereon, and an elastic coating layer former thereon. The thermistor TH₁ for detecting the surface temperature of the roller 10a as described above is in contact with the surface of the roller 10a.

Figures 1, 2:
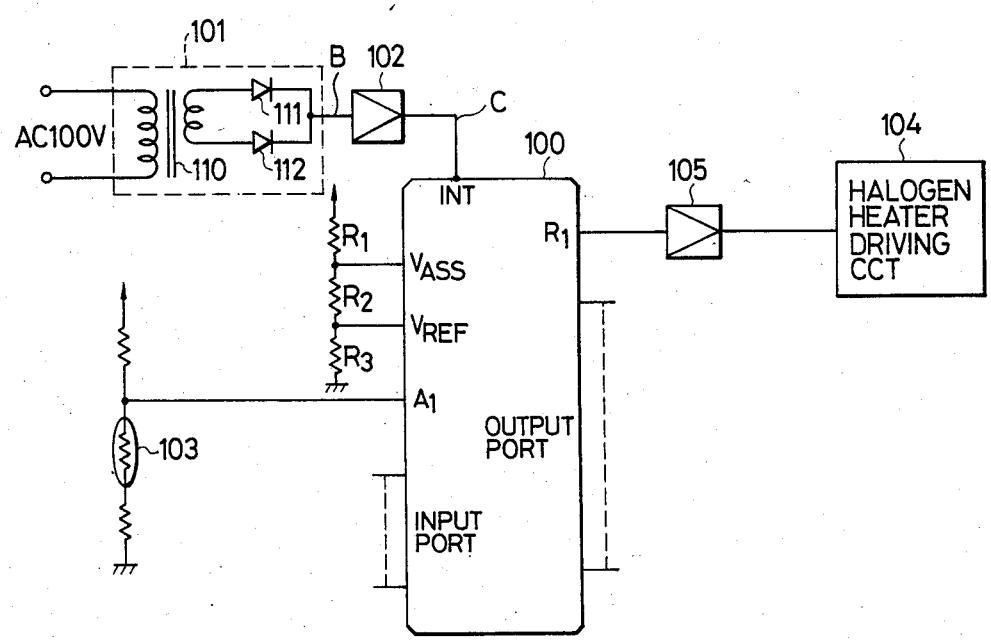
Figure 2:
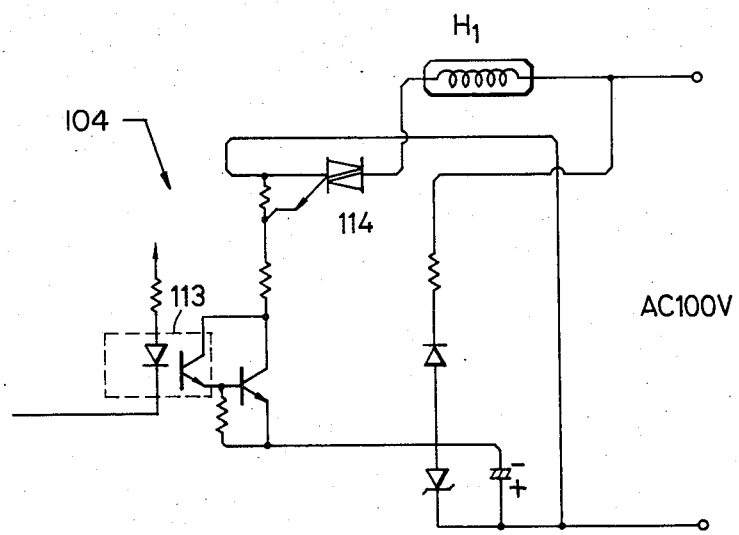

FIG. 2-1 is a block diagram of a temperature control apparatus according to the present invention. A microcomputer 100 is a known 1-chip microcomputer having ROMs, RAMs, and an 8-bit A/D converter. The microcomputer 100 may be, for example, model TMS 2300 of Texas Instruments. A full-wave rectifier 101 has a transformer 110 and diodes 111 and 112. An inverting amplifier 102 inverts and amplifies an output signal from the full-wave rectifier 101. A thermistor 103 for detecting the temperature of the fixing roller corresponds to the thermistor TH₁ shown in FIG. 1. A drive circuit 104 drives the halogen heater H₁ for heating the fixing roller. A driver 105 drives the drive circuit 104.

Figure 3:
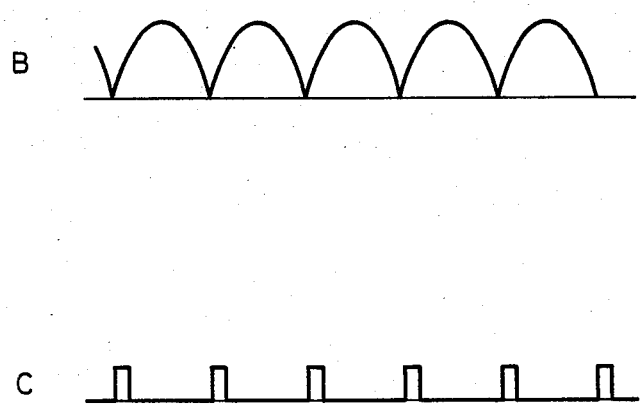

An analog input terminal A₁ of the microcomputer 100 receives a temperature detection signal from the thermistor 103. The input detection signal is converted into a digital signal by the A/D converter of the microcomputer 100 and temperature control is performed in accordance with the digital signal obtained. An interrupt terminal INT of the microcomputer 100 receives a pulse signal C from the full-wave rectifier 101 through the inverting amplifier 102. The pulse signal C is at logic level "H" near a zero crossing point of the power source voltage. When the microcomputer 100 can be interrupted, an interrupt program is executed at the leading edge of the pulse signal C. FIG. 3 shows the waveforms of outputs B and C from the full-wave rectifier 101 and the inverting amplifier 102, respectively. The drive circuit 104 is connected to an output port R₁ of the microcomputer 100 through the driver 105. The detailed configuration of the drive circuit 104 is as shown in FIG. 2-2. A signal from the driver 105 is supplied to a photocoupler 113. When the photocoupler 113 is turned on, a triac 114 is turned on and an AC voltage of 100 V is applied to the halogen heater H₁.

Although not shown in FIG. 2-1, the other input ports of the microcomputer 100 receive signals from various sensors, keys and so on for sensing a paper jam, manual feed and the like. The other output ports of the microcomputer 100 produce various control signals for various parts of the copying machine such as an exposure lamp, a paper feed roller, an optical system, or a display.

Resistors R₁, R₂ and R₃ set a reference voltage for A/D conversion of a temperature detection signal from the thermistor 103.

A temperature detection signal received at the analog input terminal A₁ is A/D converted in the following manner. When a voltage applied to the port A₁ is defined as X (V) and reference voltages set at ports I₀ and I₁ of the microcomputer 100 are defined as $V_{ASS}$ and $V_{REF}$, respectively, a digital signal has a value obtained by conversion into hexadecimal notation of b where:

$$(V_{ASS} - V_{REF})/255 = a$$

$$(X - V_{REF})/a = b$$

According to this embodiment of the present invention, the hexadecimal conversion is performed such that a digital signal obtained when the thermistor is disconnected is FF, and that obtained when the thermistor is short-circuited is 00. Reading of the temperature within a wide temperature range can be performed by performing A/D conversion of a temperature detection signal in this manner.

Figures 1, 4:
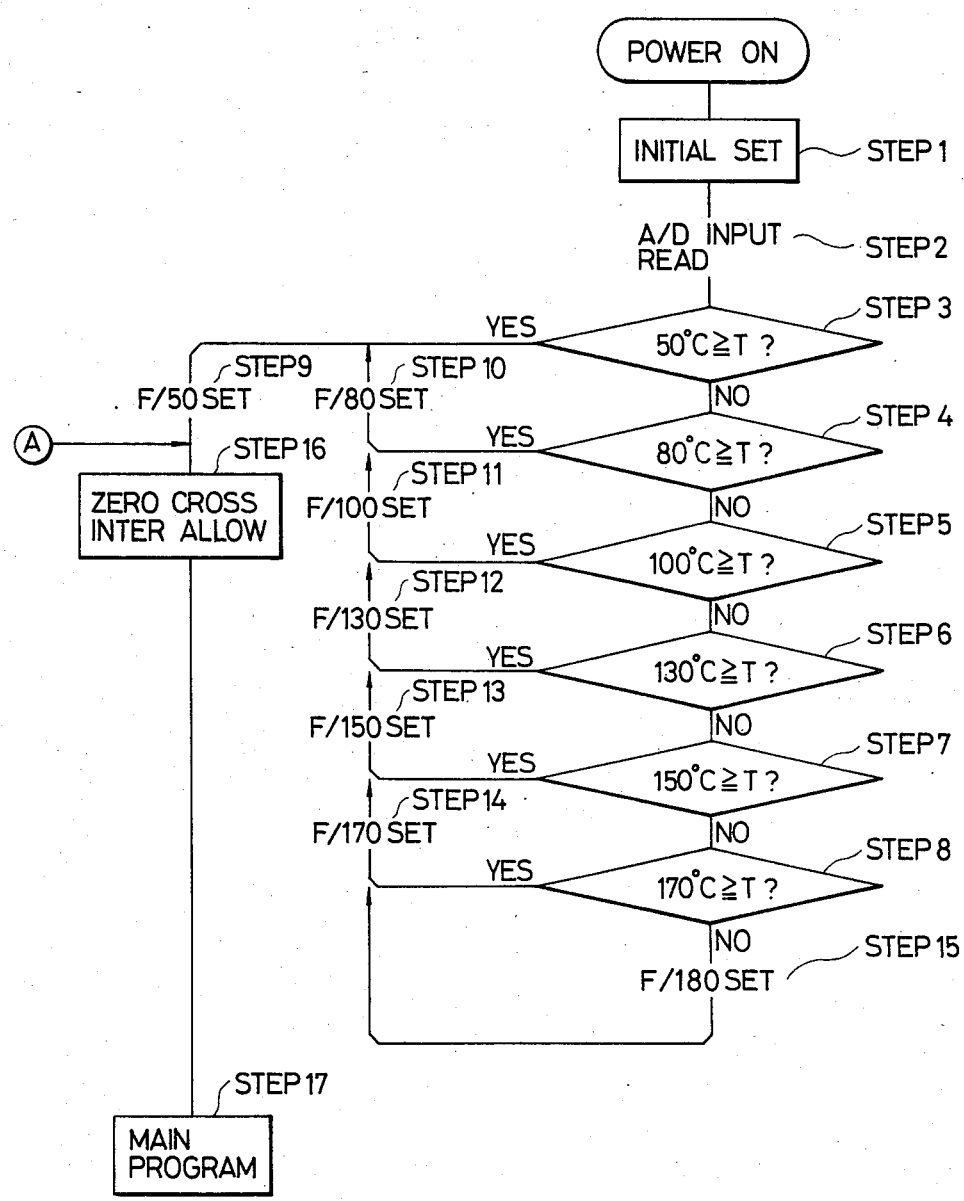
Figures 2A, 4:
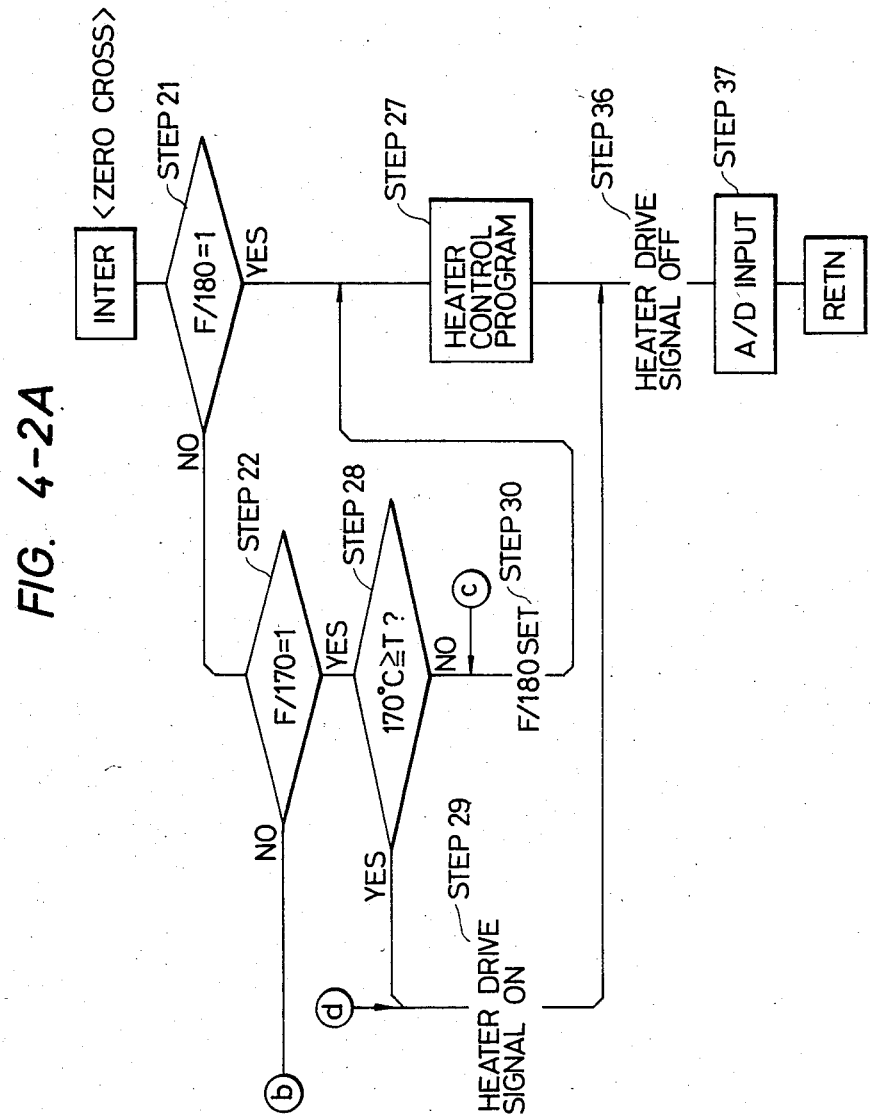
Figures 2B, 4:
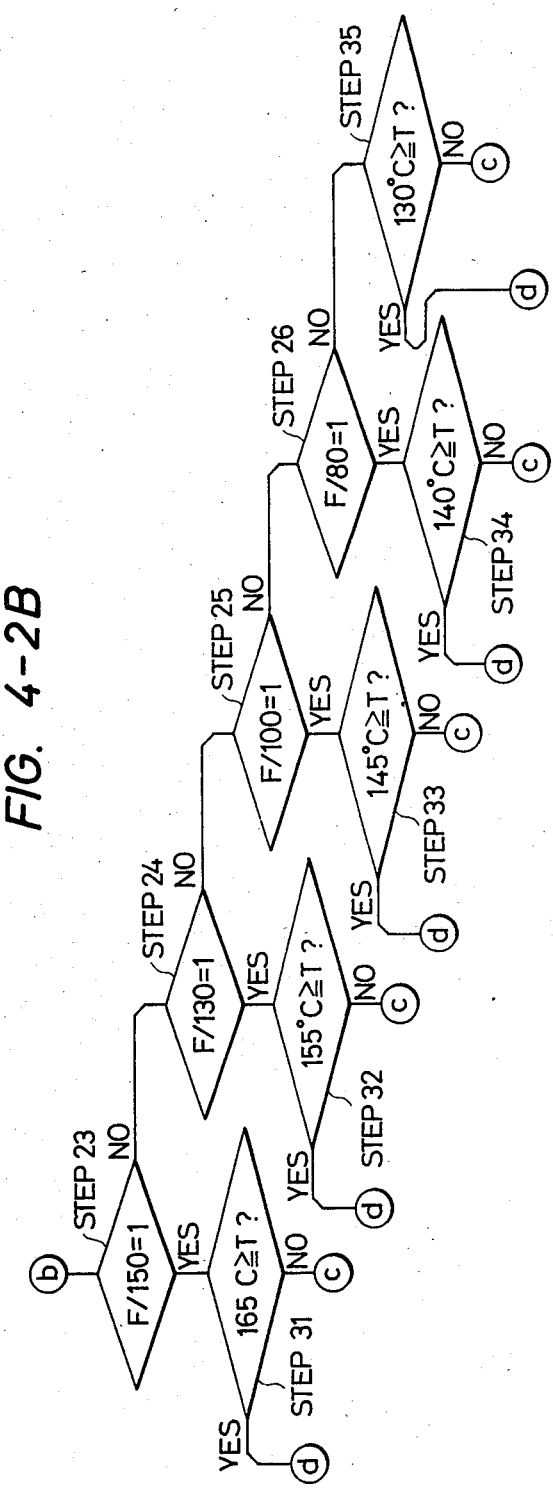
Figures 3, 4:
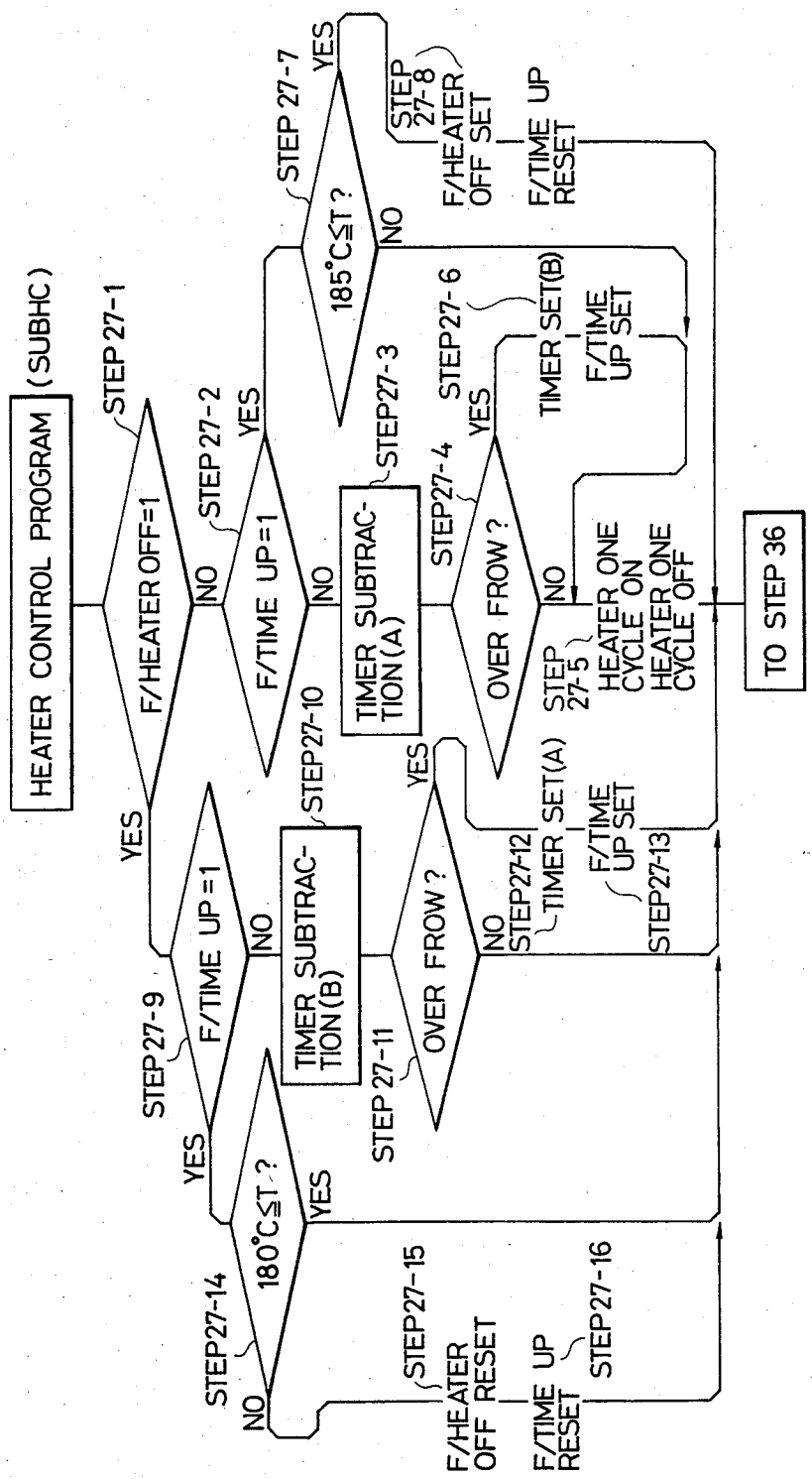
Figure 4:
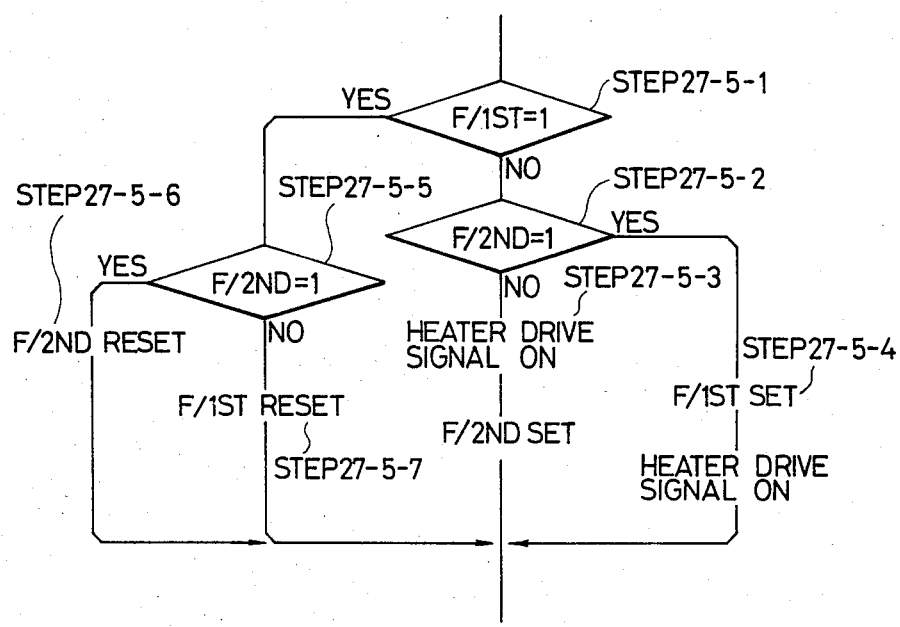

FIGS. 4-1 to 4-3 show control flowcharts according to the above-mentioned embodiment of the present invention. In this embodiment, in accordance with the detected temperature upon energization of the power source, the temperature at which switching occurs from full-wave ON/OFF control to alternate cycle ON/OFF control for control of the ON/OFF state of the halogen heater H₁ is varied. Thereafter, when the thermistor detects that the temperature of the fixer has exceeded 185° C. after alternate cycle ON/OFF control is started, a timer is started. Until this timer reaches a preset count, energization of the heater is stopped, irrespective of the detected temperature from the thermistor. When the thermistor detects that the temperature of the fixer has fallen below 180° C., another timer is started. Until this timer reaches a preset count, the heater is energized for alternate cycles irrespective of the detected temperature from the thermistor.

This will be described in more detail with reference to the flowcharts. Referring to FIG. 4-1, the memories and the like are initially set in step 1 after power is turned on. In step 2, a temperature detection signal received at the analog input terminal A₁ from the thermistor 103 is read and is A/D converted. In steps 3 to 8, it is discriminated, in accordance with the obtained digital signal, whether the surface temperature of the fixing roller is equal to or lower than 50° C., equal to or lower than 80° C., equal to or lower than 100° C., equal to or lower than 130° C., equal to or lower than 150° C., and equal to or lower than 170° C., respectively. When YES in steps 3 to 8, respectively, flags F/50, F/80, F/100, F/130, F/150, and F/170 are set in steps 9 to 14, respectively. If NO in step 8, a flag F/180 is set in step 15. When the flag F/180 is set, a copying operation can be performed. In the flowchart shown in FIG. 4-1, flags preset for temperatures lower than the detected temperature are all set. In step 16 to follow, a zero crossing interrupt is allowed. In step 17, the main program is executed. When a zero crossing pulse signal is received at the interrupt terminal INT during this processing, an interrupt program having a sequence as shown in FIG. 4-2 A and B is executed.

The interrupt program will now be described with reference to the flowchart shown in FIG. 4-2 A and B. In steps 21 to 26, it is checked whether the flags F/180, F/170, F/150, F/130, F/100 and F/80 are set, respectively. If YES in step 21, it is considered that the waiting time is up. Then, in step 27, the halogen heater is energized in accordance with the program shown in FIG. 4-3. Details of this program will be described later.

If NO in step 21, it is checked in step 22 whether the flag F/170 is set. If YES in step 22, it is checked in step 28 whether the surface temperature of the fixing roller is 170° C. or lower. If YES in step 28, a heater drive signal is turned on to perform full-wave energization in step 29. If NO in step 28, the flag F/180 is set in step 30 to indicate a waiting time up state. The flow then goes to step 27.

Similarly, if NO in step 22, it is checked in step 23 whether the flag F/150 is set. If YES in step 23, it is checked in step 31 if the surface temperature of the fixing roller is 165° C. or lower. Full-wave energization is performed until the surface temperature reaches 165° C. Thereafter, alternate cycle ON/OFF control is performed such that the heater is turned on for one cycle and it is turned off for the next cycle.

If NO in step 23, it is checked in step 24 whether the flag F/130 is set. If YES in step 23, it is then checked in step 32 whether the surface temperature of the fixing roller is 155° C. or lower. Full-wave energization is performed until the surface temperature reaches 155° C. Thereafter, alternate cycle ON/OFF control is performed.

If NO in step 24, it is checked in step 25 whether the flag F/100 is set. If YES in step 25, it is checked in step 33 whether the surface temperature of the fixing roller is 145° C. or lower. Full-wave energization is performed until the surface temperature reaches 145° C. Thereafter, alternate cycle ON/OFF control is performed.

If NO in step 25, it is checked in step 26 whether the flag F/80 is set. If YES in step 26, it is checked in step 34 whether the surface temperature of the fixing roller is 140° C. or lower. Full-wave energization is performed until the surface temperature reaches 140° C. Thereafter, alternate cycle ON/OFF control is performed.

IF NO in step 26, that is, if the flag F/50 is set, it is checked in step 35 whether the surface temperature of the fixing roller is 130° C. or lower. Full-wave energization is performed until the surface temperature reaches 130° C. Thereafter, alternate cycle ON/OFF control is performed.

After step 36 wherein the heater drive signal is turned on, the fixing roller surface temperature is read in step 37.

The heater control program in step 27 will now be described with reference to FIG. 4-3. According to this program, the temperature from that at which the heater starts to be energized is different from that at which the heater starts to be stopped. When these temperatures are detected, the heater is respectively energized and deenergized for a predetermined period of time, irrespective of the detected temperature from the thermistor.

Referring to FIG. 4-3, it is checked in step 27-1, whether the flag F/heater OFF is set. The flag F/heater OFF is a flag for deenergizing the halogen heater $H_1$ and is reset when the heater is to be turned on. If NO in step 27-1, it is discriminated in step 27-2 whether the flag F/time up is set. The flag F/time up is a flag which represents time up for maintaining the halogen heater $H_1$ ON. If NO in step 27-2, a preset timer count A corresponding to an ON time of the heater is decremented by one every time a pulse is received at the interrupt terminal INT, in step 27-3. Until it is determined in step 27-4 that the timer has overflowed, alternate cycle ON/OFF control of the halogen heater $H_1$ is performed in step 27-5. The ON/OFF control of the heater in step 27-5 is shown in FIG. 4-4. This will be described in more detail later. When pulses supplied to the interrupt terminal INT are counted and overflow is detected in step 27-4, the flow advances to step 27-6 wherein a preset timer count B is set and the flag F/time up is set. The count B corresponds to an OFF time of the timer.

If YES in step 27-2, the flow advances to step 27-7 wherein it is checked whether the temperature detected by the thermistor is 185° C. or higher. Until YES is obtained in step 27-7, alternate cycle ON/OFF control of the heater $H_1$ is performed in step 27-5. When YES in step 27-7, the flag F/time up is set and the flag F/time up is reset in step 27-8. The heater is then deenergized.

If YES in step 27-1, the flow advances to step 27-9 wherein it is checked whether the flag F/time up is set. Until YES is obtained in step 27-9, the count B representing the OFF time of the heater is decremented by one every time a pulse is received at the interrupt terminal INT. During this time, the halogen heater $H_1$ is kept OFF. When an overflow of the timer is detected in step 27-11, the count A representing the ON time of the heater is set in step 27-12 and the flag F/time up is set in step 27-13.

When the flag F/time up is set in step 27-9, the flow advances from step 27-9 to step 27-14 wherein it is checked whether the temperature detected by the thermistor $TH_1$ is 180° C. or higher. If YES in step 27-14, the heater is kept OFF. When NO is obtained in step 27-14, the flow advances to step 27-15 wherein the flag F/heater OFF is reset. Then in step 27-16, the flag F/time up is reset. Alternate cycle ON/OFF control of the heater is then performed as described above The alternate cycle ON/OFF control of the halogen heater in step 27-5 will now be described in more detail with reference to the flowchart shown in FIG. 4—4. In steps 27 5-1 and 27-5-2, it is checked whether the flags F/1st and F/2nd are set. The flags F/1st and F/2nd are flags for energizing the heater for the first and second half cycles, respectively, of a single AC cycle. If neither of the flags F/1st and F/2nd are set, the flow advances to step 27-5-3 wherein the heater drive signal is turned on to start energizing the heater for the first half cycle of the single AC cycle. Then, in the next interrupt control sequence, the flow advances from step 27-5-1 to step 27-5-2. Since the flag F/2nd is set in this case, the flow advances to step 27-5-4 wherein the heater drive signal is turned on to start energizing the heater for the second half cycle of the AC cycle. At the same time, the flag F/1st is set. In the next interrupt control sequence, since both the flags F/1st and F/2nd are set, the flow advances from step 27-5-1 to steps 27-5-5 and 27-5-6 wherein the flag F/2nd is reset. In the next interrupt control sequence, the flow advances from step 27-5-5 to step 27-5-7 wherein the flag F/1st is reset. Thus, during the time of a second single AC cycle wherein the flags F/2nd and F/1st are reset, the halogen heater is kept OFF.

In this manner, the halogen heater is turned on and off for alternate AC cycles.

Figure 5:
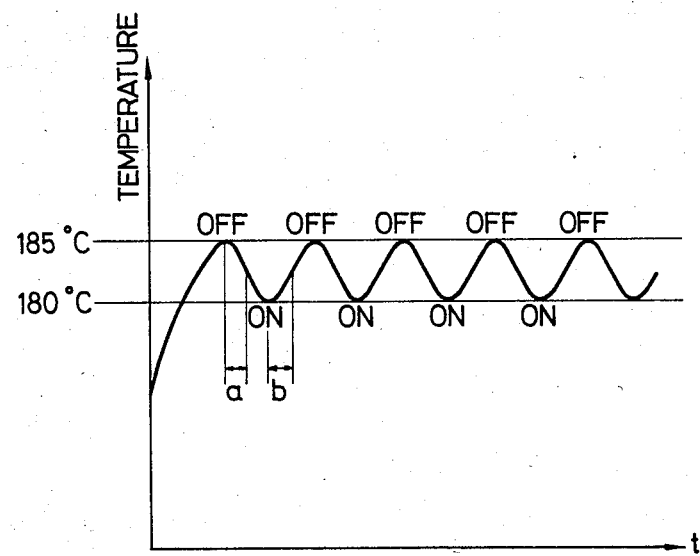
FIG. 5 is a graph showing temperature characteristics when temperature control is performed in accordance with the flowcharts shown in FIGS. 4-1 to 4-4.

FIG. 5 is a graph showing the temperature characteristics when the heater is controlled in accordance with the flowcharts shown in FIGS. 4-1 to 4-4 In FIG. 5, reference symbol a represents an ON time of the heater set by a timer, while b represents an OFF time of the heater set by another timer.

In the embodiment described above, the switching temperature at which switching occurs from full-wave energization to alternate cycle ON/OFF control is controlled in accordance with the initial temperature. However, alternatively, the duration of full-wave energization can be controlled.

Moreover, in the embodiment described above, the temperature at which the heater is turned on is different from the temperature at which the heater is turned off. When these temperatures are detected, the corresponding timers are started. Until predetermined periods of times preset by the timers are up, the heater is kept ON and OFF, respectively, irrespective of the detected temperature from the thermistor. However, either ON or OFF control can be performed.

Figure 6:
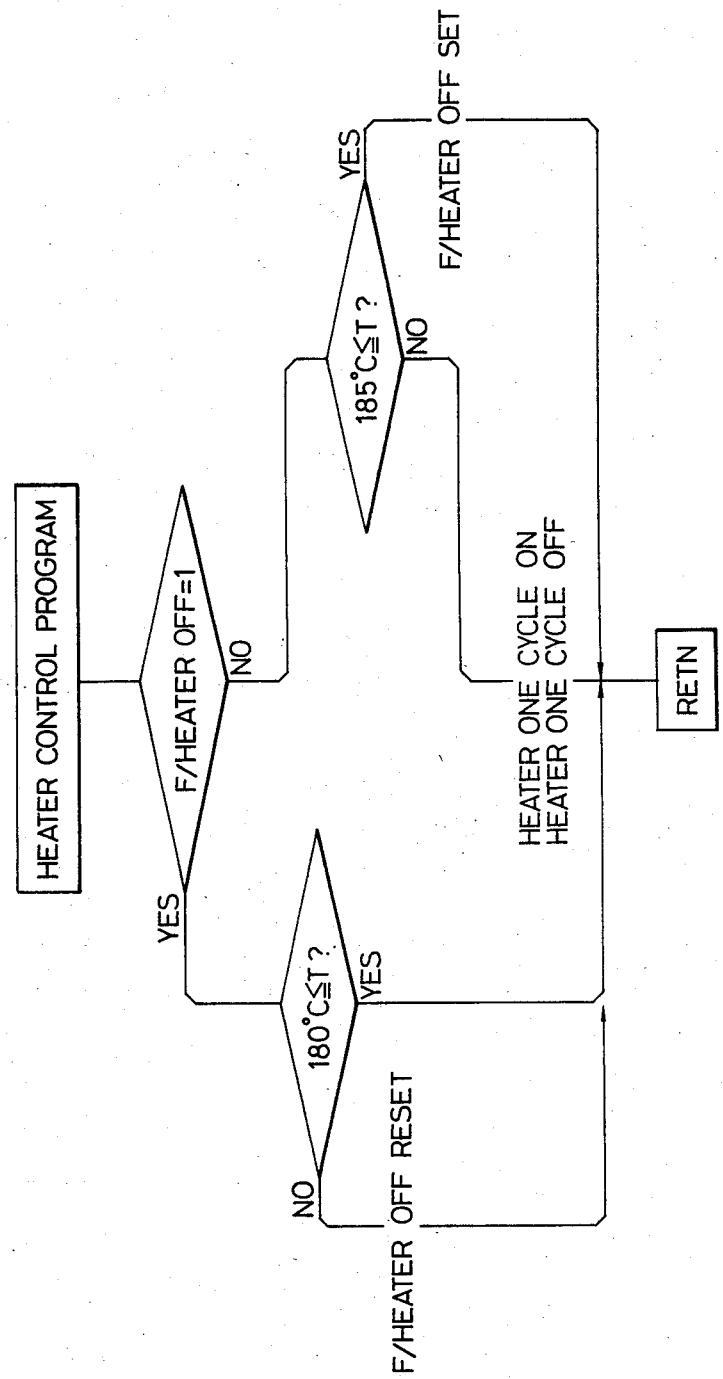
FIG. 6 is a flowchart according to another embodiment of the present invention.

FIG. 6 shows a flowchart for performing ON/OFF control of the heater wherein the temperature (180° C.) at which the heater is turned on is different from the temperature (185° C.) at which the heater is turned off, without using timers for heater ON/OFF control. This control sequence may be performed as in step 27 shown in FIG. 4-1.

In this example, alternate cycle ON/OFF control is performed until the detected temperature from the thermistor becomes 185° C. or higher, and the heater is turned off when the detected temperature exceeds 185° C. After the temperature has fallen below 180° C., alternate cycle ON/OFF control is again performed.

Figure 7:
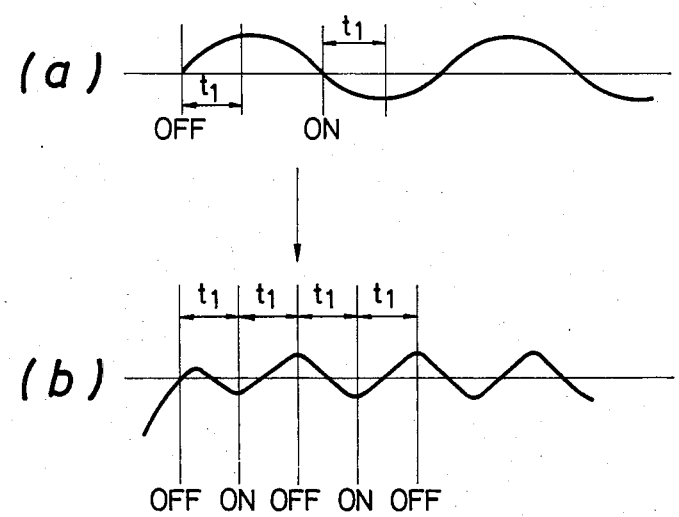
FIG. 7 is a graph showing temperature characteristics according to still another embodiment of the present invention.

If only one control temperature (180° C.) can be used, the heater is kept ON or OFF for a predetermined period of time after the heater is turned ON or OFF, respectively. In this case, control can be performed by performing a checking operation as in step 27-7 in FIG. 4-3 with respect to 180° C. FIG. 7 shows the temperature characteristics when such control is performed. FIG. 7(a) shows a case wherein the heater is kept ON or OFF after a timer time t1 has elapsed from the time the heater is turned on or off. FIG. 7(b) shows a case wherein the heater is continuously turned off or on after a timer time t1 has elapsed from the time the heater is turned on or off.

In the embodiments described above and to be described below, flags and timers are set in predetermined memory areas in a RAM in the microcomputer.

According to the present invention, the generation of noise upon turning the heater on or off can be prevented, so that erratic operation due to such noise can be prevented. Furthermore, the adverse influence of a rush current on AC loads can also be reduced to the minimum.

Figure 9:
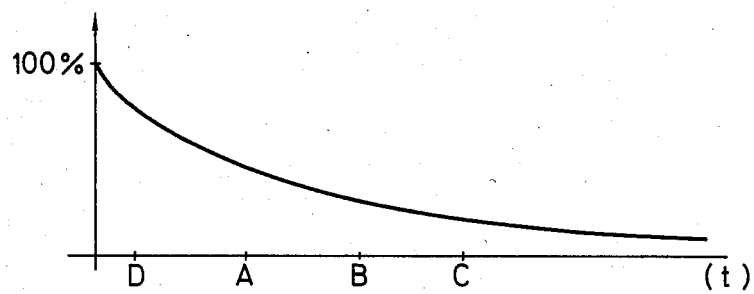
FIG. 9 is a graph showing impedance as a function of OFF time of a heater.

The impedance of the halogen heater $H_1$ decreases over time after it is turned off, as shown in FIG. 9, wherein the impedance of the ON heater is defined as 100%. Accordingly, if the halogen heater $H_1$ is repeatedly turned on and off when its impedance is low, a rush current flows to adversely affect AC loads and the like.

Figure 8:
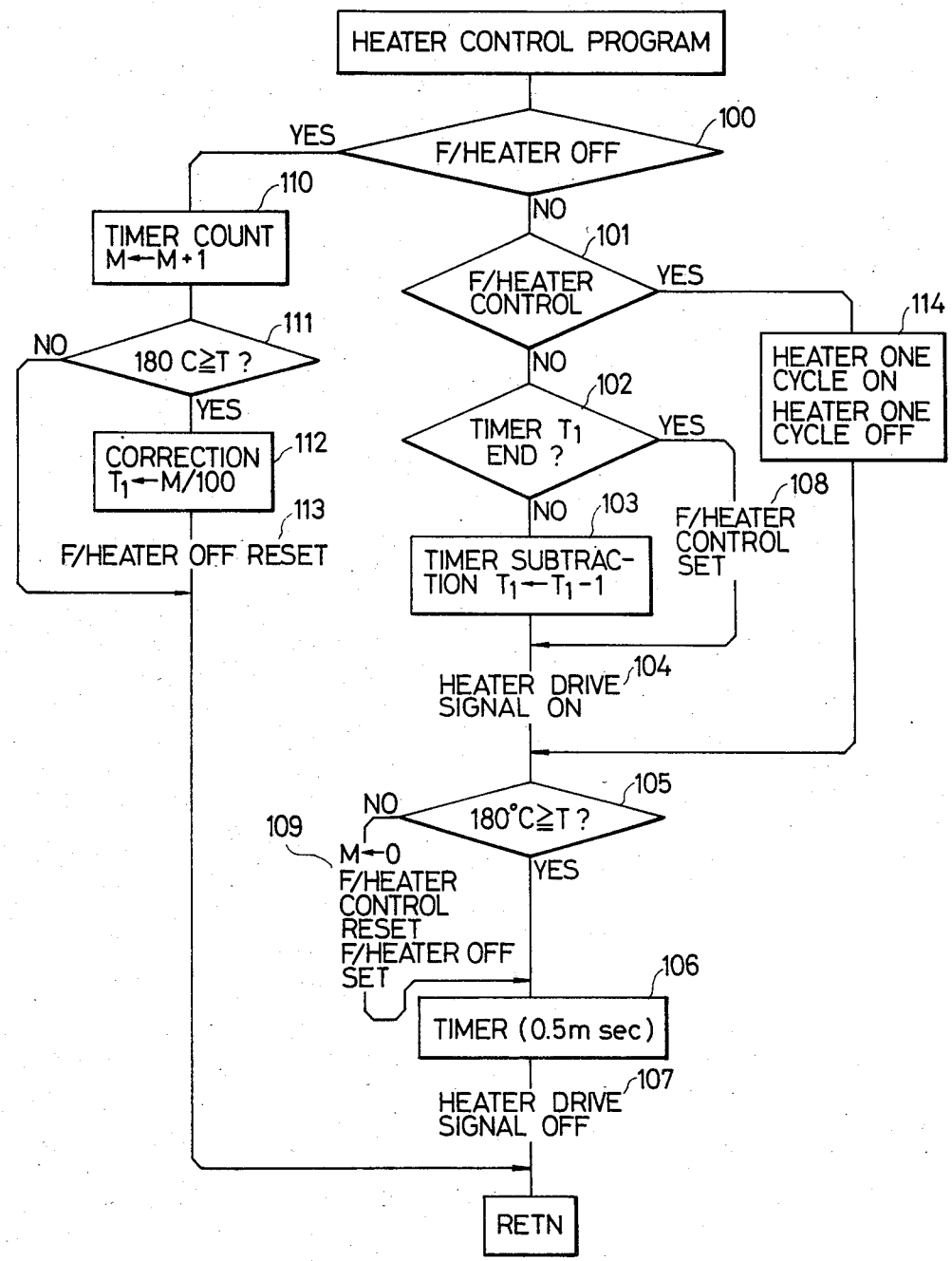
FIG. 8 is a flowchart according to still another embodiment of the present invention.
Figure 10:
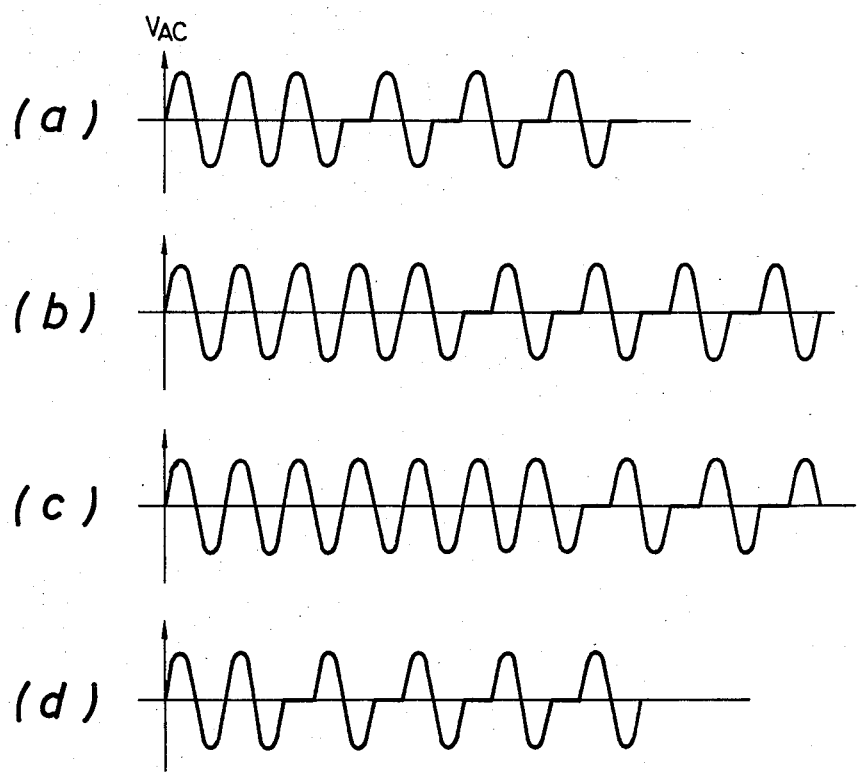
FIGS. 10(a) to 10(d) show the ON mode when temperature control is performed in accordance with the flowchart shown in FIG. 8.

FIG. 8 shows a control flowchart for controlling the ON/OFF mode as shown in FIG. 10, according to which the ON time of the halogen heater is controlled in accordance with a detected OFF time of the heater.

In this case, the control section for performing such control has a similar configuration to that shown in FIG. 2-1.

The details of this control sequence will now be described with reference to the flowchart shown in FIG. 8.

After memories and the like are initialized upon turning on of the power source, an interrupt is allowed in the main routine and an interrupt pulse is received. Then, it is checked in step 100 whether the flag F/heater OFF for turning off the heater $H_1$ is set. If YES in step 100, the flow advances to step 110. On the other hand, if NO in step 100, the flow advances to step 101. Since the flag is not set initially, the flow advances to step 101 wherein it is checked whether the flag F/heater control is set. Since this flag is not set initially, the flow advances to step 102 wherein it is determined whether the timer $T_1$ for determining the full-wave energization time has completed its count. The timer $T_1$ is preset to a count value which is smaller than that for attaining 180° C. from ambient temperature by full-wave energization of the heater. Since this flag is not set initially, the timer $T_1$ is decremented by one in step 103 and a heater drive signal is produced to turn on the heater $H_1$ in step 104.

When the heater drive signal rises, the heater $H_1$ is energized for an AC half cycle. It is then checked in step 105 whether a detected temperature by the thermistor 103 is 180° C. or lower. If YES in step 105, the timer is operated for 0.5 msec in step 106 and the heater drive signal is turned off in step 107. The flow then returns to the main routine. Until the timer $T_1$ has completed its count, steps 101 to 107 are executed to full-wave energize the heater $H_1$ every time an interrupt pulse is received. When the timer $T_1$ has completed its count, the flag F/heater control is set in step 108. When the next interrupt pulse is received, alternate cycle ON/OFF control is performed in step 114. Since the control sequence in step 114 is the same that described with reference to FIG. 4-4, a description thereof is omitted. When it is detected in step 105 that the detected temperature is higher than 180° C., the flow advances to step 109 wherein a timer M for measuring the OFF time of the heater is set to 0, the flag F/heater control is reset, and the flag F/heater OFF is set. When the next interrupt pulse is received, the flow advances from step 100 to step 110 to increment the count of the timer M by one. Steps 100, 110 and 111 are executed to operate the timer M and measure the OFF time of the heater until the detected temperature from the thermistor 103 is detected to be 180° C. or lower in step 111.

When the detected temperature becomes 180° C. or lower in step 111, a value obtained by dividing the count of the timer M, that is, the OFF time of the heater $H_1$, by 100 is set in the timer $T_1$. In step 113, the flag F/heater OFF is reset.

Full-wave energization is performed in accordance with the preset count in the timer $T_1$. When the timer $T_1$ completes its count, alternate cycle ON/OFF control of the heater $H_1$ is performed in a manner as described above FIGS. 10(a) to 10(d) are examples of ON/OFF control modes according to the flowchart shown in FIG. 8, and show heater ON/OFF control modes when the heater OFF time is A to D as shown in FIG. 9.

In this manner, since the ON/OFF control mode of the heater is controlled in accordance with the OFF time of the heater, the adverse influence of a rush current on AC loads can be reduced to the minimum. In addition, the power fluctuation time upon turning on the power source and power consumption can be reduced to the minimum.

As described hereinabove, the impedance of the halogen heater $H_1$ decreases over time upon being turned off as shown in FIG. 9, wherein the impedance of the ON heater is defined as 100%. Thus, the fluctuation in the power source voltage is different depending upon the timing at which the heater is turned on.

Figure 11:
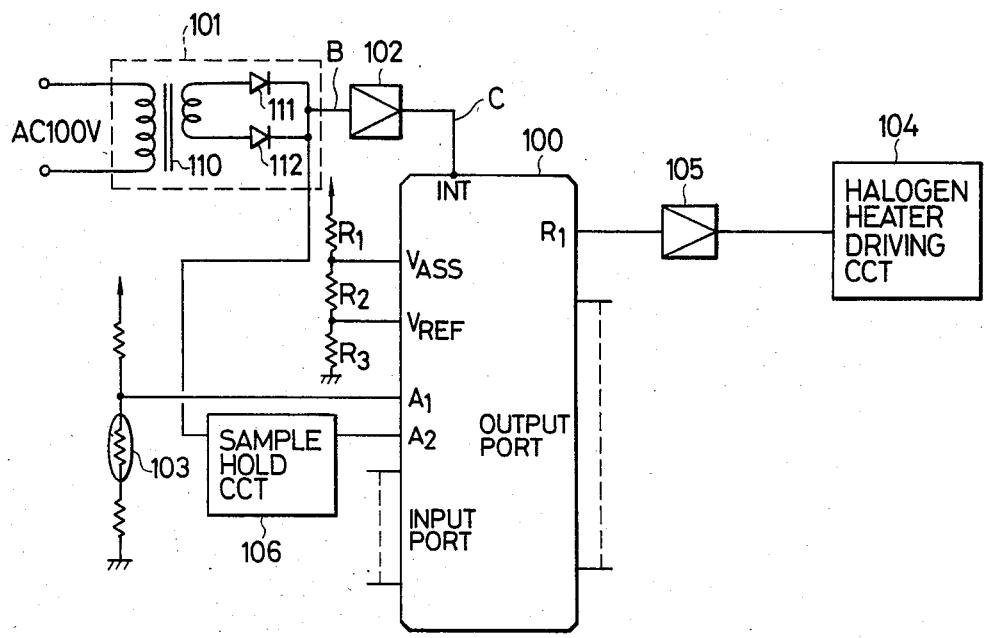
FIG. 11 is a block diagram of a control section according to still another embodiment of the present invention.

It is therefore possible to control the ON time of the heater as shown in FIG. 10 by detecting the fluctuation in the power source voltage when the heater starts to be turned on. FIG. 11 shows a block diagram of a control section for performing such temperature control. The same reference numerals as used in FIG. 2-1 denote the same parts in FIG. 11. Reference numeral 106 in FIG. 11 denotes a sample hold circuit for sampling and holding a power source voltage so as to monitor the state of an AC 100 V power source.

Figures 1, 12:
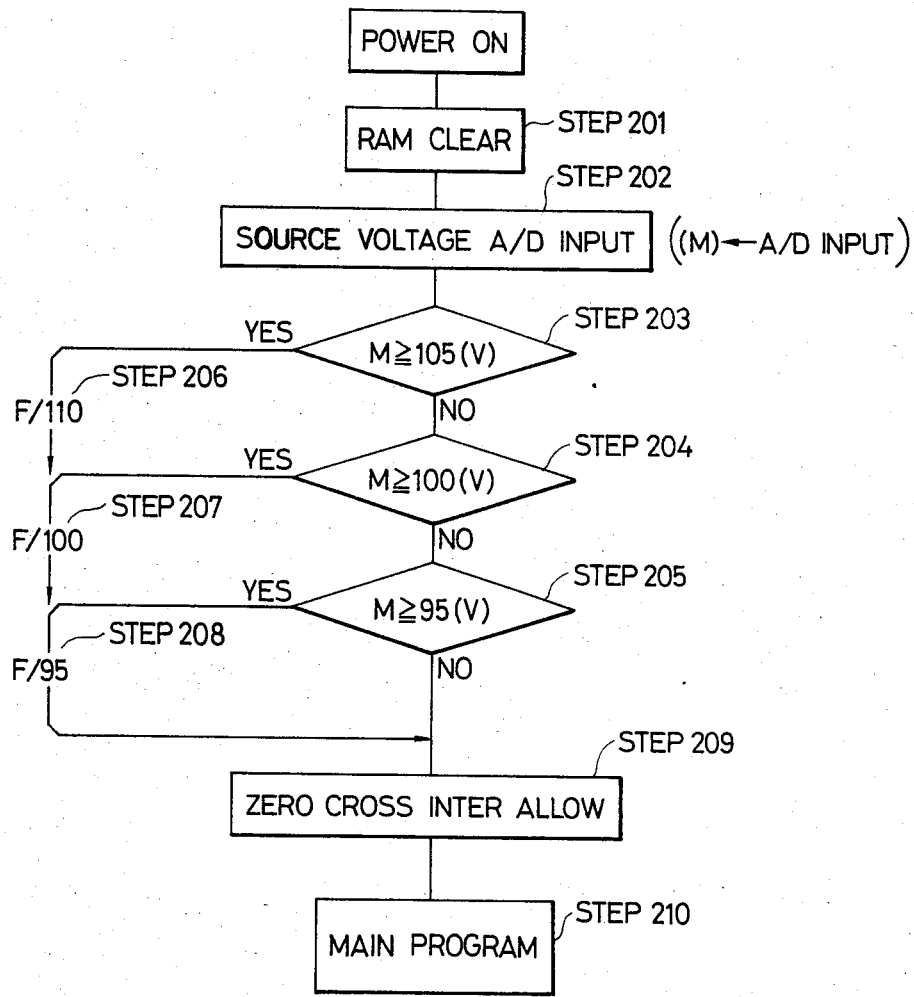
Figures 2, 12:
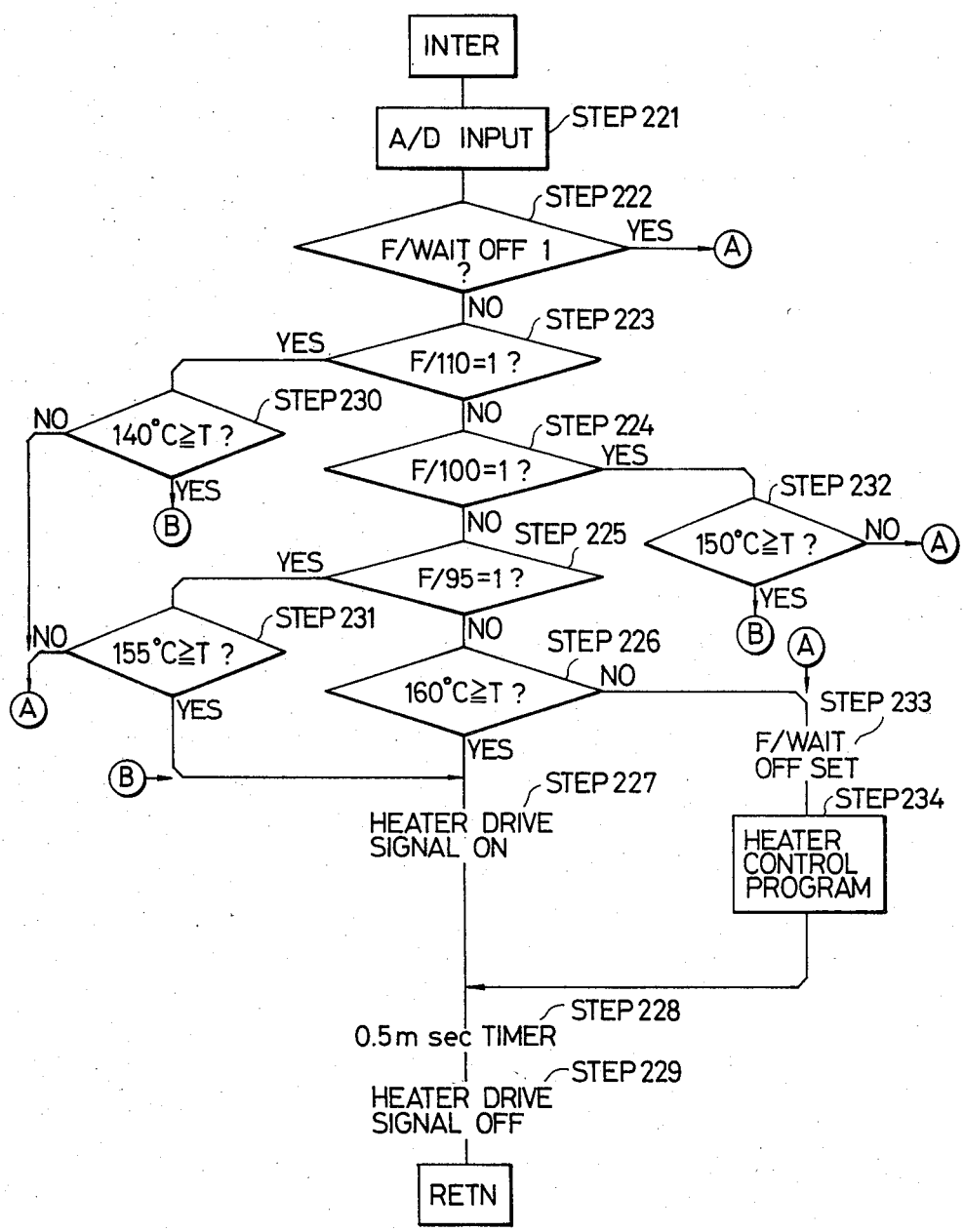
Figures 4, 12:
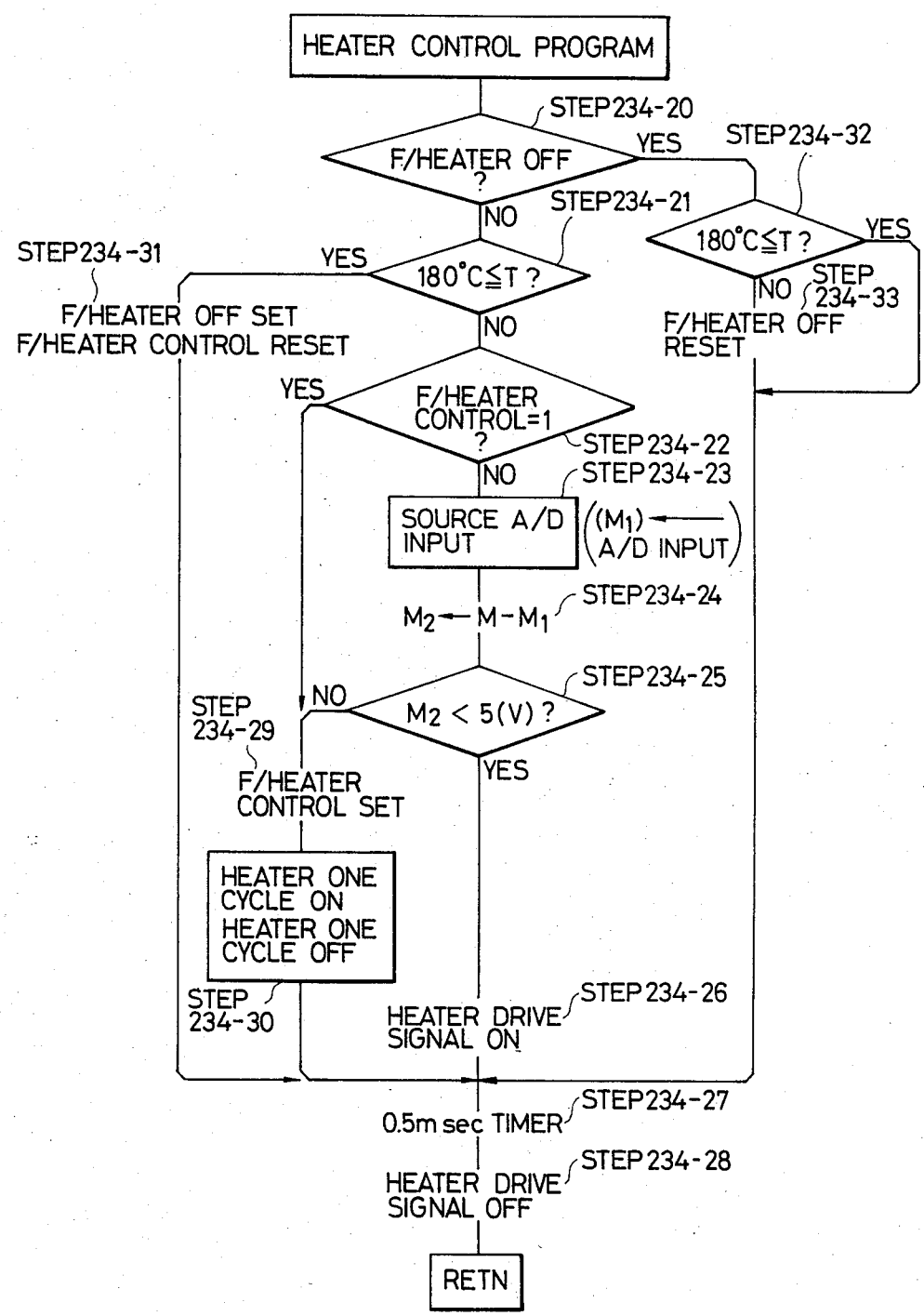

FIGS. 12-1 to 12-3 are flowcharts for controlling the ON/OFF states of the heater by detecting the fluctuation in the power source voltage.

In this embodiment, the preset temperature at which switching occurs from full-wave energization to alternate cycle ON/OFF control is changed in accordance with the power source voltage detected upon turning on the heater. In addition to this, the duration of full-wave energization is changed in accordance with the fluctuation in the power source voltage detected upon turning on the heater. This will be described in more detail with reference to the flowchart shown in FIG. 12-1.

After the power source is turned on, the RAMs and the like are cleared in step 201 in FIG. 12-1. In step 202, a power source voltage monitor signal from the sample hold circuit 106 is supplied to a port $A_2$ and is A/D converted. In steps 203 to 205, it is checked whether the power source voltage is 105 V or higher, 100 V or higher, or 95 V or higher, respectively, in accordance with the digital signal obtained. If YES in steps 203 to 205, respectively, the flags F/110, F/100 and F/95 are set in steps 206 to 208, respectively. In step 209, the zero crossing interrupt is enabled, and the main program is executed in step 210. When a zero crossing pulse signal is supplied to an interrupt terminal INT, the interrupt program shown in FIG. 12-2 is executed.

The interrupt program will now be described with reference to the flowchart shown in FIG. 12-2. In step 221, a temperature detection signal from the thermistor 103 is A/D converted as described above. It is then checked in step 222 whether the flag F/WAIT OFF is set. The flag F/WAIT OFF is a flag which indicates the end of waiting time; when it is set copying can be performed. If YES in step 222, the flow advances to step 233. If NO in step 222, it is checked in steps 223 to 225, respectively, whether the flags F/110, F/100 and F/95 indicating the state of the power source voltage are set. If YES in step 223, the flow advances to step 230 wherein it is checked whether the surface temperature of the fixing roller read in step 221 is 140° C. or lower. If YES in step 230, the flow advances to steps 227 to 229 wherein the heater $H_1$ is turned on by a control signal received by an output port $R_1$ and is energized for one cycle of 0.5 msec, and the heater $H_1$ is then turned off to perform full-wave energization. If NO in step 230, the flow goes to step 233 wherein the flag F/WAIT OFF is set. Thereafter, in step 234, the heater control program as will be described hereinafter is performed in step 234. If YES in step 224, the flow advances to step 232 wherein it is checked whether the surface temperature of the fixing roller is 150° C. or higher. If YES in step 232, the flow advances to step 227 to perform full-wave energization. If NO in step 232, the flow goes to step 233 so as to perform heater ON control. IF YES in step 225, the flow goes to step 231 wherein it is checked whether the surface temperature of the fixing roller is 155° C. or lower. If YES in step 231, the flow advances to step 227 wherein full-wave energization is performed. If NO in step 231, the flow advances to step 233 to perform heater ON control. If NO in all of the steps 223, 224 and 225, it is checked in step 226 whether the surface temperature of the fixing roller is 160° C. or lower. If YES in step 226, the flow goes to step 227 wherein full-wave energization is performed. If NO in step 226, the flow advances to step 233 to perform heater ON control.

The heater control program in step 234 will now be described with reference to the flowchart shown in FIG. 12-3. According to this program, the duration of full-wave energization is corrected in accordance with a difference $M_2$ between an input voltage M when the power source for the halogen heater is initially turned on and an input voltage $M_1$ when the halogen heater starts to be turned on. The program will be described further with reference to FIG. 12-3.

It is checked in step 234-1 whether the flag F/heater OFF is set. The flag F/heater OFF is a flag for turning off the halogen heater $H_1$ and is set when the heater $H_1$ is to be turned off. If NO in step 234-1, it is checked in step 234-2 whether the surface temperature of the fixing roller is 180° C. or higher. If YES in step 234-2, the flow advances to step 234-16. If NO in step 234-2, the flow advances to step 234-3 wherein it is checked whether the flag F/heater control is set. The flag F/heater control is a flag for controlling full-wave energization or alternate cycle ON/OFF control of the heater $H_1$. If YES in step 234-3, the flow advances to step 234-13. If NO in step 234-3, the flag F/heater control is set in step 234-4. In step 234-5, a power source voltage monitor signal $M_1$ from the sample hold circuit 106 is read. In step 234-6, a difference $M_2$ between the signal $M_1$ and an input voltage M read in step 202 is calculated. In step 234-7, the difference $M_2$ is doubled to set a count of a timer $M_3$. This timer $M_3$ is used for correcting the duration of full-wave energization. It is then checked in step 234-8 whether the timer $M_3$ has completed its count. If YES in step 234-8, the flow goes to step 234-11. Until YES is obtained, the count of the timer $M_3$ is decremented by one upon reception of each interrupt signal in step 234-9. After step 234-9, in steps 234-10 to 234-12, the halogen heater $H_1$ is turned on by a drive signal from an output port $R_1$ so as to perform full-wave energization. The 0.5 msec timer in step 234-11 is a timer which serves to determine the pulse width of a heater drive signal (trigger pulse) produced from the port $R_1$ for turning on the halogen heater $H_1$. When the heater drive signal rises, the halogen heater $H_1$ is turned on for an AC half cycle.

Until YES is obtained in step 234-2, the flow advances from step 234-3 to step 234-13. Until the timer $M_3$ completes its count, the flow advances from step 234-13 to steps 234-8 to 234-12 so as to perform full-wave energization. When the time is up, the flag F/heater control is set in step 234-14. In step 234-15, alternate cycle ON/OFF control of the halogen heater $H_1$ is performed in accordance with the flowchart shown in FIG. 4-4. Until the surface temperature reaches 180° C., steps 234-3, and 234-13 to 234-15 are performed so as to perform alternate cycle ON/OFF control of the halogen heater H₁.

When YES is obtained in step 234-2 (when the surface temperature of the fixing roller is detected to be 180° C. or higher), the flag F/heater OFF is set, the flag F/heater control is set, and the flag F/heater control 1 is reset, in step 234-16. Until the surface temperature falls below 180° C., the flow advances from step 234-1 to step 234-17, and turning on of the halogen heater H₁ is prevented. In step 234-17, it is checked if the surface temperature is still 180° C. or higher. If NO in step 234-17, the flag F/heater OFF is reset in step 234-18 so as to perform full-wave energization or alternate cycle ON/OFF control of the halogen heater H₁ upon reception of the next interrupt pulse.

In the embodiment described above, the duration of full-wave energization of the heater is corrected by the timer in accordance with the difference between an input voltage upon turning on of the power source and an input voltage when the heater starts to be turned on. This embodiment will further be described with reference to the flowchart shown in FIG. 12-4. In this embodiment, the flowchart shown in FIG. 12-4 is executed in place of the flowchart shown in FIG. 12-3.

Referring to FIG. 12-4, it is checked in step 234-20 whether the flag F/heater OFF is set. The flag F/heater OFF is a flag for turning off the halogen heater H₁ and is not set when the halogen heater H₁ is to be turned on. If NO in step 234-20, it is checked in step 234-21 whether the surface temperature of the fixing roller detected by the thermistor 103 is 180° C. or higher. If YES in step 234-21, the flow advances to step 234-31 wherein the flag F/heater OFF is set and the flag F/heater control is reset. However, if NO in step 234-21, the flow advances to step 234-22 wherein it is checked whether the flag F/heater control is set. The flag F/heater control is a flag for performing full-wave energization or alternate cycle ON/OFF control. If the flag F/heater control is not set, the flow advances to step 234-29. If the flag is reset, the flow advances to step 234-23. In step 234-23, a power source voltage monitor signal M₁ from the circuit 106 is read in so as to calculate a difference M₂ between the voltage M₁ and the input voltage M read in in step 202. In step 234-5, the difference M₂ is compared with a reference value (5 V). If M₂<5 (V), in steps 234-26 to step 234-28, the halogen heater H₁ is turned on for an AC half cycle (50 Hz) by a drive signal from the output port R₁. If NO in step 234-5, the flag F/heater control is set in step 234-29, and alternate cycle ON/OFF control is performed in step 234-30. This control in step 234-30 is the same as that described with reference to the flowchart shown in FIG. 4-4.

When YES is obtained in step 234-21 and the flag F/heater OFF is set in step 234-31, the heater is stopped until the surface temperature is detected to have fallen below 180° C. in step 234-32. If NO is obtained in step 234-32, the flag F/heater OFF is reset in step 234-33 and the above-mentioned control is repeated until the next interrupt pulse is received.

Figure 13:
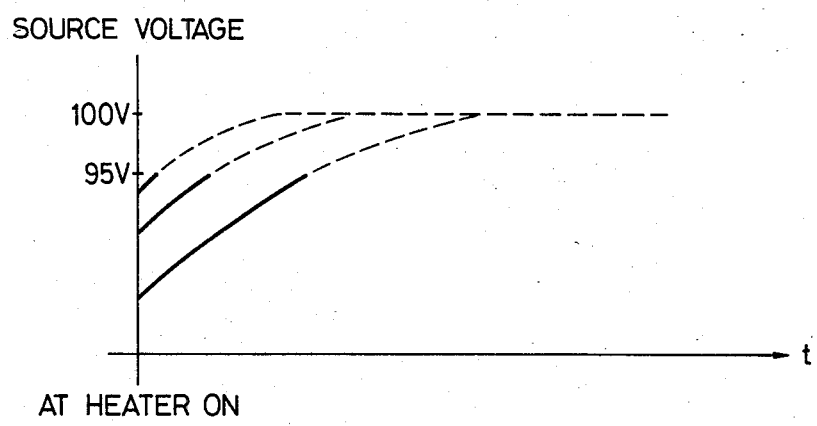
FIG. 13 is a graph showing temperature characteristics when temperature control is performed according to the flowcharts shown in FIGS. 12-1, 12-2, 12-4 and 4-4.

FIG. 13 is a graph showing the temperature characteristics when control is performed in accordance with the embodiment described above. In this embodiment, even when the heater is turned on at any point in FIG. 5, a switch is made from full-wave energization to alternate cycle ON/OFF control when the power source voltage reaches 95 V.

It is also possible to change the preset temperature at which full-wave energization is switched to alternate cycle ON/OFF control, in accordance with the input voltage in the initial period after the power source is turned on. In this case, the control flowchart as shown in FIG. 4-3 must be executed in addition to the flowchart shown in FIG. 12-3. With such a control sequence, a preset temperature at which full-wave energization is switched to alternate cycle ON/OFF control is changed in accordance with an input voltage obtained when the power source is initially turned on. In addition to this, the temperature at which the heater is turned on is different from the temperature at which the heater is turned off. When these preset temperatures are detected, the heater is kept ON and OFF in the respective cases for a predetermined period of time, irrespective of the detected temperature from the thermistor.

Figure 14:
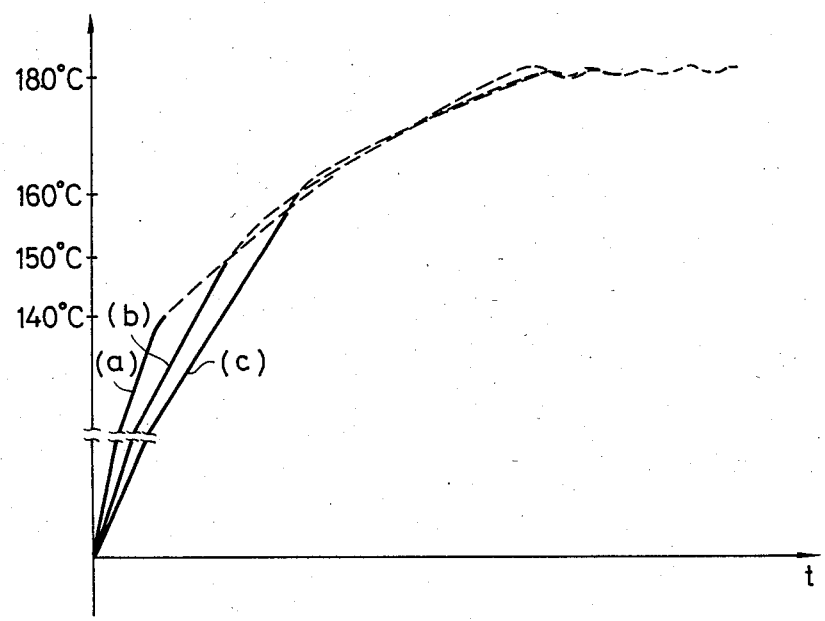
FIG. 14 is a graph showing temperature characteristics when temperature control is performed according to the flowcharts shown in FIGS. 12-1, 12-2, 4-3 and 4-4.

FIG. 14 is a graph showing temperature characteristics when the heater is controlled in accordance with the flowcharts shown in FIGS. 12-1, 12-2, 4-3 and 4-4. Curve (a) corresponds to a case wherein the input voltage is 110 V, curve (b) corresponds to a case wherein the input voltage is 100 V, and curve (c) corresponds to a case wherein the input voltage is 95 V. When the input voltage reaches 140° C., 150° C., and 155° C., respectively, control of the heater is switched from full-wave energization to alternate cycle ON/OFF control, and the waiting time is ended. That is, when the input voltage is low, the temperature at which a switch is made from full-wave energization to alternate cycle ON/OFF control, that is, the waiting time up temperature, is set to be high. Otherwise, the waiting time up temperature is set to be low.

Since the apparatus of the present invention has the configuration as described above, an overshoot which frequently occurs when the input voltage is high can be prevented. Moreover, even when the input voltage is low, a waiting time before allowing copying can be shortened.

Since ON/OFF control of the heating source is performed in accordance with an input voltage, the time required to attain a predetermined temperature can be shortened, and an overshoot can be prevented.

What is claimed is:

1. A temperature control apparatus comprising:
   a heating source for generating heat upon being turned on;
   detecting means for detecting a temperature of said heating source; and
   control means for controlling electric power supplied to energize said heating source, in accordance with an output from said detecting means;
   wherein said control means is operable in a plurality of control modes each mutually different in its form of said electric power supply to said heating source, and selects a predetermined control mode from said plurality of control modes in accordance with an initial output from said detecting means. which initial output is produced when said heating source is first turned on.

2. An apparatus according to claim 1, wherein said control means determines a predetermined temperature at which power to be supplied to said heating source is changed in accordance with the output from said detecting means.

3. An apparatus according to claim 2, wherein said control means performs full-wave energization of said heating source until the predetermined temperature is reached.

4. A temperature control apparatus comprising:
a heating source for generating heat upon being turned on;
detecting means for detecting a temperature of said heating source; and
control means for controlling electric power supplied to energize said heating source, such that when said detecting means detects a first temperature, conduction of the electric power to said heating source is turned on, and when said detecting means detects a second temperature, conduction of the electric power to said heating source is turned off;
wherein said control means holds the electric power supplied to said heating source in a condition set by said control during a predetermined time period without regard to a subsequent output of said detecting means after conduction of the electric power to said heating source is turned on or off.

5. A temperature control apparatus comprising:
a heating source for generating heat upon being turned on;
a power source for energizing said heating source;
detecting means for detecting a state of said power source; and
control means for controlling electric power supplied to said heating source from said power source in accordance with an output from said detecting means;
wherein said control means is operable in a plurality of control modes, and selects a predetermined control mode from said plurality of control modes in accordance with the output from said detecting means which is produced when said heating source is first turned on.

6. An apparatus according to claim 5, wherein the state of said power source is an output voltage obtained when said heating source starts to be turned on.

7. An apparatus according to claim 6, wherein said detecting means detects a power source voltage when said power source is initially turned on or when said heating source starts to be turned on after said power source is initially turned on.

8. An apparatus according to claim 7, wherein said control means selectively performs the ON/OFF control of said heating means in a first mode and a second mode, and controls an ON time in the first mode in accordance with the output from said detecting means.

9. An apparatus according to claim 7, wherein said control means performs the ON/OFF control of said heating means in a first mode and a second mode, and controls a switch from the first mode to the second mode in accordance with a difference between a power source voltage when said power source is initially turned on and the power source voltage when said heating source starts to be turned on after said power source is initially turned on.

10. An apparatus according to claim 8 or 9, wherein the first mode is a full-wave energization mode.

11. An apparatus according to claim 8 or 9, wherein the second mode is an alternate cycle ON/OFF mode.

12. A temperature control apparatus comprising:
a heating source for generating heat upon being turned on;
a power source for energizing said heating source;
detecting means for detecting a non-operating time of said heating source; and
control means for controlling electric power supplied to said heating source from said power source, in accordance with an output from said detecting means;
wherein said control means is operable to switch a conduction mode from a first conduction mode, wherein a first electric power is supplied to said heating source, to a second conduction mode, wherein a second electric power which is smaller than the first electric power is supplied to said heating source, in accordance with the non-operating time detected by said detecting means, so that the electric power supplied to said heating source is controlled.

13. An apparatus according to claim 12, wherein said control means changes an ON/OFF control mode of said heating means in accordance with the OFF time.

14. An apparatus according to claim 13, wherein said control means changes a duration of full-wave energization in accordance with the OFF time.

15. A temperature control apparatus comprising:
a heating source for generating heat upon being turned on;
detecting means for detecting a temperature of said heat source;
converting means for converting an output from said detecting means into a digital signal; and
control means for setting said heating source in an ON state at a first temperature and in an OFF state at a second temperature different from said first temperature in accordance with the digital signal from said converting means, so that the temperature of said heating source is adjustable over a range between the first temperature and the second temperature.

* * * * *

UNITED STATES PATENT AND TRADEMARK OFFICE
CERTIFICATE OF CORRECTION

PATENT NO.   :   4,603,245
DATED        :   July 29, 1986
INVENTOR(S)  :   TOSHIAKI YAGASAKI It is certified that error appears in the above-identified patent and that said Letters Patent is hereby corrected as shown below:

```
Column 5, line 44, change "IF NO" to --If NO--.

Column 7, line 1, change "4-4 In" to --4-4.  In--.

Column 8, line 36, change "same that" to
              --same as that--.

Column 10, line 5, change "IF YES" to --If YES--.

Column 12, line 59, change "means." to --means,--.

In the ABSTRACT, line 8, change "period time"
              to --time period--.

In Sheet 7 of 17, Fig. 4-3, change "OVER FROW?"
              to --OVER FLOW?--. (both occurrences)
```

Signed and Sealed this

Twenty-seventh Day of January, 1987

*Attest:*

DONALD J. QUIGG

*Attesting Officer*      *Commissioner of Patents and Trademarks*